Aug. 2, 1960  LE ROY V. OXLEY ET AL  2,947,320
CONVERTIBLE VALVE STRUCTURE

Filed Nov. 8, 1954  3 Sheets-Sheet 1

Inventors
LeRoy V. Oxley
Clarence M. Blythe
By Shoemaker & Mattare
ATTYS

Aug. 2, 1960   LE ROY V. OXLEY ET AL   2,947,320
CONVERTIBLE VALVE STRUCTURE
Filed Nov. 8, 1954   3 Sheets-Sheet 2

Inventors
Le Roy V. Oxley
Clarence M. Blythe
By Shoemaker + Mattare
ATTYS.

Aug. 2, 1960
LE ROY V. OXLEY ET AL
2,947,320
CONVERTIBLE VALVE STRUCTURE
Filed Nov. 8, 1954
3 Sheets-Sheet 3
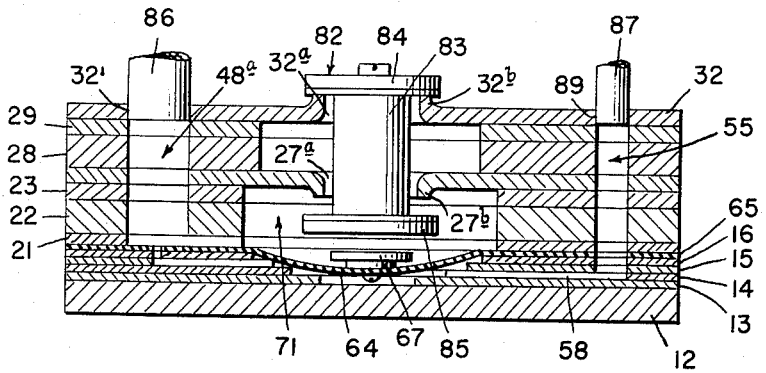
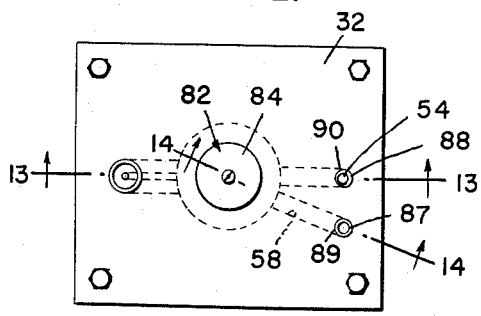
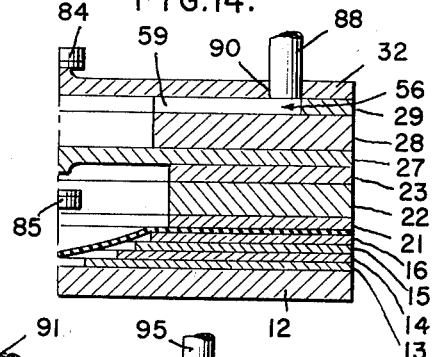
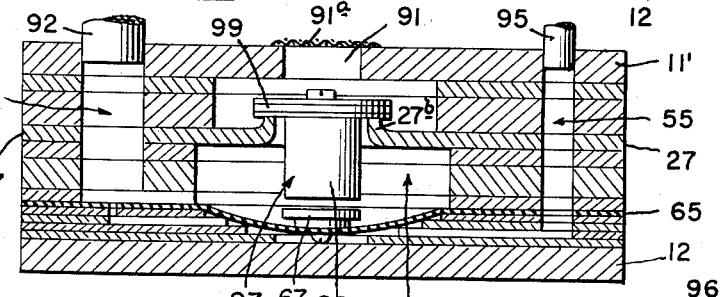
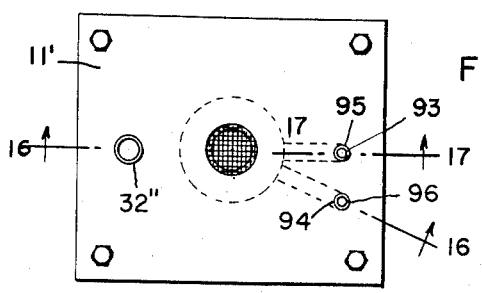
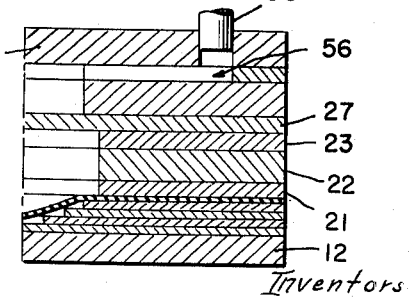
Inventors
Le Roy V. Oxley
Clarence M. Blythe
By Shoemaker & Mattare
ATTYS.

United States Patent Office 2,947,320
Patented Aug. 2, 1960

2,947,320

CONVERTIBLE VALVE STRUCTURE

Le Roy V. Oxley and Clarence M. Blythe, Hendersonville, N.C., assignors to Robotyper Corporation, Hendersonville, N.C., a corporation of Michigan Filed Nov. 8, 1954, Ser. No. 467,354

8 Claims. (Cl. 137—271)

This invention relates generally to the class of valves and is directed particularly to a new and novel valve construction.

In many pneumatic systems, use is made of a multiplicity of automatically operating or functioning valve units wherein a number of such valves are of one type or style and a number of others forming a second group are of another type and, possibly, a number of still others forming a third group are of a still different type. Such valves, or different types and designed to perform different functions may have certain similarities of construction or design but, under present methods of construction, parts of one may not be adaptable to use in another and, accordingly, each of the valves, while having features similar to the others, is individually tooled and set up or assembled. Accordingly, separate groups of parts must be maintained for constructing and assembling the different types of valves.

This not only requires the use of a great deal of storage space but ties up a lot of material which might be put to other uses if interchangeable parts could be used for building up or assembling the different types of valves.

A particular object of the present invention is, accordingly, in the light of the foregoing, to provide a new and novel valve construction, more particularly a chambered valve casing, wherein standardized parts are provided by means of which any one of a number of different types of valves from the simplest to the most complex, may be built up by the proper selection and assembling of such standard parts one upon the other.

The present invention contemplates the provision of a number of stamped plates or laminae having apertures, slots and channels which are so arranged or disposed that by proper selection and placement of said plates or laminae one upon the other there may be built up a valve casing having a single valve chamber or a number of valve chambers together with passages leading to and from such chambers for the movement of air into and out of the same to actuate a movable valve element, the shifting of which governs the movement of the air through the passages.

By the present invention, by providing a number of each of the different forms of the punched or stamped laminae and having each identified by a suitable reference character, any one of a number of different types of valve housings may be set up or fabricated by assembling the necessary plates or laminae in accordance with a predetermined reference index.

The invention will be best understood from a consideration of the following detailed description taken in connection with the accompanying drawings forming a part of the specification, with the understanding, however, that the invention is not confined to a strict conformity with the showing of the drawings but may be changed or modified within the scope of the appended claims.

In the drawings:

Fig. 12 is a view in top plan of another type of valve constructed in accordance with the present invention.

Fig. 13 is a sectional view taken in a vertical plane on the line 13—13 of Fig. 12 and on an enlarged scale.

Fig. 14 is a partial section in a vertical plane taken on the line 14—14 of Fig. 12, on an enlarged scale.

Fig. 15 is a view in top plan of still another type of valve constructed in accordance with the present invention.

Fig. 16 is a sectional view taken in a vertical plane on the line 16—16 of Fig. 15, on an enlarged scale.

Fig. 17 is a partial section taken in a vertical plane on the line 17—17 of Fig. 15 and on an enlarged scale.

As hereinbefore stated, the invention is directed to the new and novel idea of building up valve units or valve housings for such units by the selective assembly of preformed or stamped plate members and, in Figs. 1 to 4 of the drawings, there is illustrated an assemblage of such plate members for the provision of a valve casing for a completed valve structure of the type illustrated in Figs. 5 to 11. This assemblage of preformed plates embodies all of the plates required for the fabrication of the bodies for other and simpler types of valves such as are illustrated in Figs. 13 to 17 inclusive.

In Figs. 1 to 4, the numeral 10 generally designates the body of assembled or stacked plates or laminae wherein the top plate is designated 11 and the bottom plate is designated 12.

Figure 1:
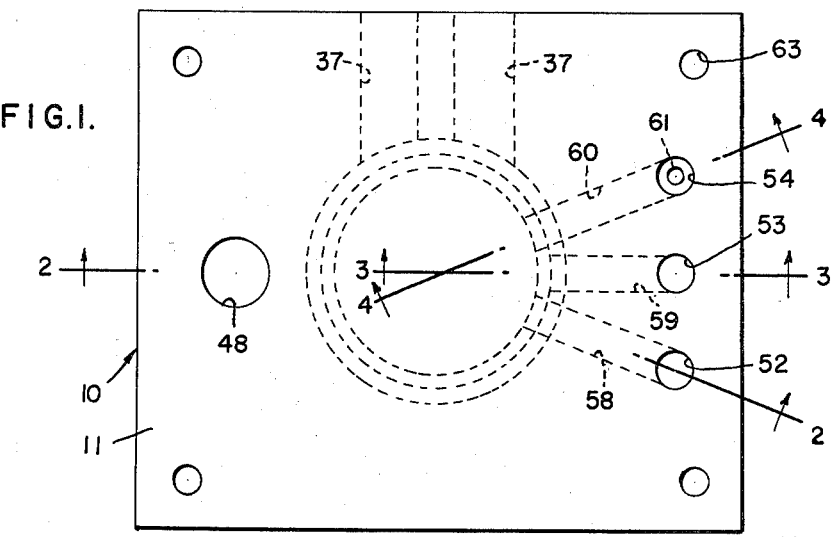
Fig. 1 is a view in plan of a valve body of one type set up or fabricated in accordance with the present invention but not showing securing bolts or other means for maintaining the plates or laminae in assembled relation or coupling nipples by which air lines may be connected with the air passages of the body.
Figure 2:
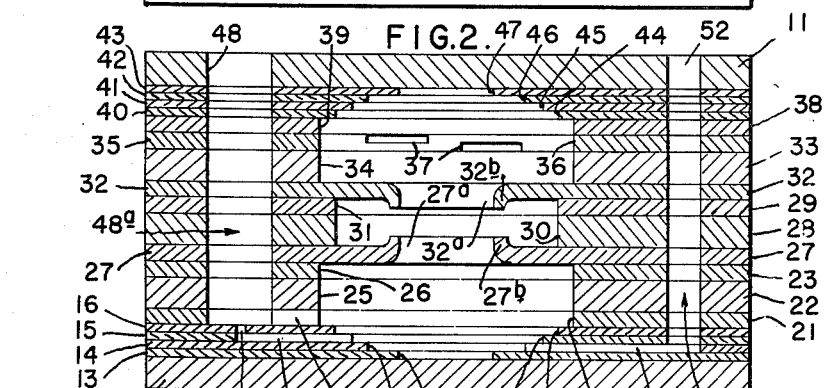
Fig. 2 is a vertical section taken substantially on the line 2—2 of Fig. 1.

Proceeding from the bottom plate 12 upwardly through the group illustrated in Fig. 2, each of the plates or laminae will be identified and the identification references used in this group will be employed in the description of different types of valves which may be built up therefrom as illustrated in the succeeding figures.

The base plate 12 is preferably of metal. The reference characters 13, 14, 15 and 16 designate laminae which may be identified as pouch laminae or plates. These are respectively provided with central circular openings 17, 18, 19 and 20 of different and progressively increasing diameters.

Resting upon the pouch laminae or plates are spacer laminae 21, 22 and 23 which are respectively provided with a central circular opening 24, 25 and 26 which are of the same diameter and of larger diameter than the opening 20 in the top one of the lower group of pouch laminae.

The numeral 27 designates a valve seat plate or lamina and the numerals 28 and 29 designate spacer plates or laminae overlying and supported by the seat lamina 27. The spacing laminae 28 and 29 are respectively provided with the circular openings 30 and 31.

The numeral 32 designates a second valve seat plate or lamina and the numeral 33 designates a spacer lamina corresponding to the laminae 25 and 26 and having a central opening 34 therethrough.

The numeral 35 designates a plate or lamina corresponding to the spacer lamina but of a special design in that, in addition to having the central opening 36, it is provided with breather channels 37 leading from the central opening through a side edge thereof and, accordingly, this lamina 35 is identified as a breather plate or lamina.

The numeral 38 designates another spacer plate or lamina having the central opening 39 and overlying and resting upon the lamina 38 is a second group or series of pouch laminae which are designated 40, 41, 42 and 43 which are respectively provided with the central openings of progressively decreasing diameter from the lowermost to the uppermost one of the group as indicated respectively at 44, 45, 46 and 47.

The top plate 11 has formed therethrough an aperture 48 for the purpose hereinafter described and this aperture aligns with and forms a part of a passage generally designated 48a which extends downwardly through the plates to and through the first or lowermost spacer plate 21 where it communicates with the inwardly extending slot 49 which opens through the edge of the opening 24, as illustrated.

The top pouch plate 16 of the bottom group of four has a bleed passage 50 which communicates with the passage 48a, and this bleed passage communicates with a slot 51 formed in the pouch plate 15 and leading into the center of the group of plates to open through the central opening 19, as shown, and for the purpose hereinafter set forth.

The opening 48 is positioned at one side of the center of the group of plates and at the opposite side, the top plate 11 has the three openings 52, 53 and 54 therethrough which respectively communicate with passages 55, 56 and 57. The passage 55 extends downwardly through alined apertures in the plates to and terminates in the pouch plate 14 where it communicates with a slot 58 which leads inwardly through the edge of and into the opening 18.

Figures 3, 4:
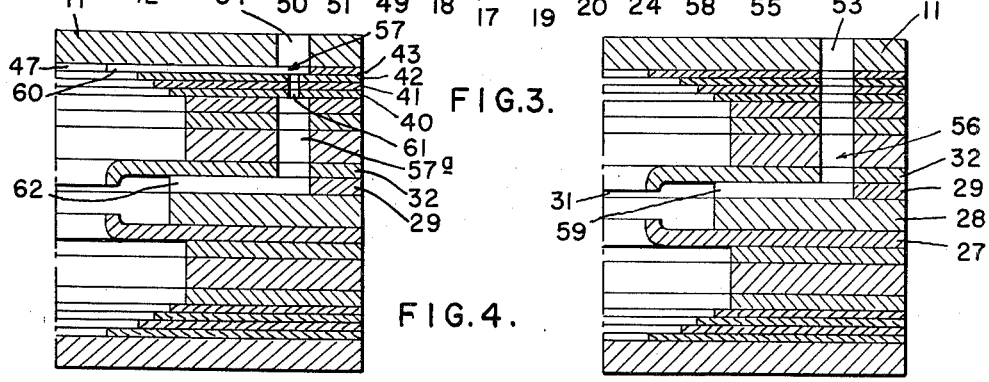
Fig. 3 is a vertical section taken transversely of one half of the valve body substantially on the line 3—3 of Fig. 1.
Fig. 4 is a sectional view taken substantially on the line 4—4 of Fig. 1, the section extending in a vertical plane through approximately half the width of the body, and being on an enlarged scale.

The passage 56 leads downwardly through the aligned openings in the plates to and terminates in the spacer plate 29 which lies below the uppermost one of the seat plates 32 and this spacer plate 29 has the inwardly extending slot 59 which communicates with the opening 31 in the center thereof as shown in Fig. 3.

The third passage 57 terminates in the top pouch lamina 43 and communicates with the inwardly extending slot 60 which opens into the center opening 47 of this lamina or plate, as shown in Fig. 4. The passage 57 also communicates with the small bleed passage 61 which is formed through the several pouch plates 42, 41 and 40 and communicates with a lower passage 57a which extends downwardly through the underlying spacer plates to and through the uppermost seat plate 32 to the spacer plate thereberneath where it communicates with the inwardly extending slot 62 which opens into the central opening 31 of this spacer.

While the several plates or laminae employed for building up a valve casing may be of any desired material, it is preferred that the top and bottom plates 11 and 12 and the valve seat forming plates 27 and 32 be of metal while the remaining plates may be formed of any suitable material such as fiber, plastic, or any other material of a suitable character which is non-porous.

It is also to be pointed out that the pouch plates or laminae and the spacer plates may be of any desired thickness but it is preferable that they be of relatively thin material to facilitate punch forming the same.

In connection with the seat plates 27 and 32, these are provided respectively with the central openings 27a and 32a and, in punch forming these openings, the edge of each opening is burred or turned slightly to form a valve seat or flange, the seat for the plate 27 being designated 27b and the seat for plate 32 being designated 32b.

All of the plates provided for making up a valve have suitable openings formed therethrough which are aligned in the assembled plates to receive securing bolts or rivets. Such openings are shown for the top plate 11 at each of the four corners thereof and are designated 63, and it will be understood that, while not illustrated, each of the underlying plates will have corresponding openings for the purpose stated.

Figure 6:
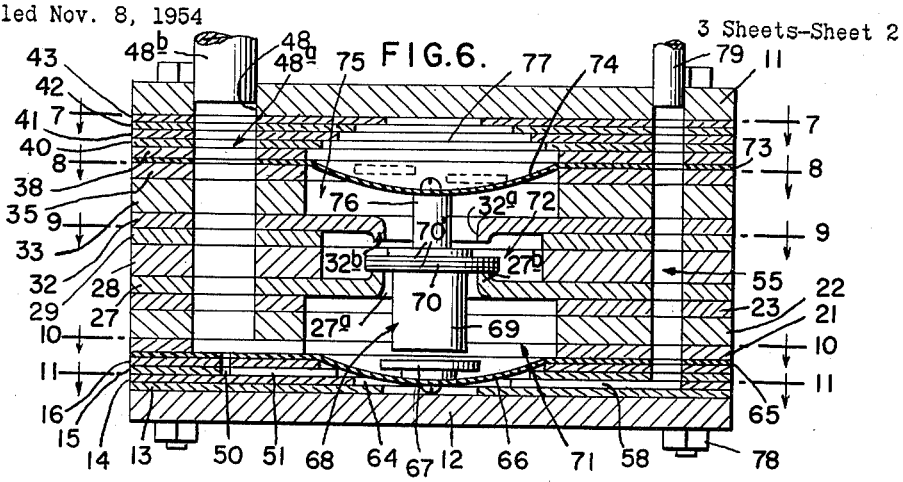
Fig. 6 is a sectional view taken in a vertical plane substantially on the line 6—6 of Fig. 5 showing the movable valve element in the chambered body together with leather diaphragms separating certain of the chambers.
Figure 7:
Fig. 7 is a horizontal section on the line 7—7 of Fig. 6, on a reduced scale.
Figure 8:
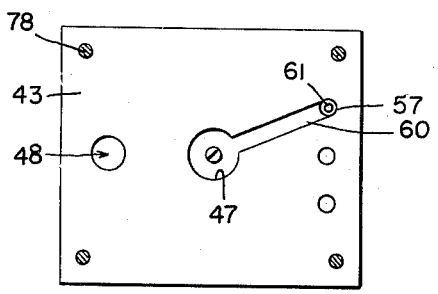
Fig. 8 is a horizontal section taken on the line 8—8 of Fig. 6 below the diaphragm leather, on a reduced scale.
Figure 9:
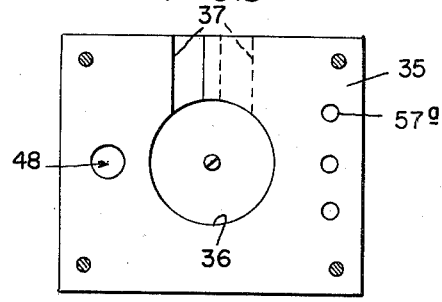
Fig. 9 is a sectional view taken substantially on the line 9—9 of Fig. 6, on a reduced scale.
Figure 10:
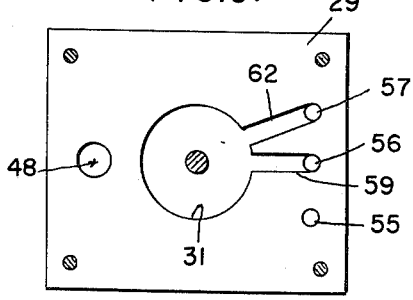
Fig. 10 is a sectional view taken on the line 10—10 of Fig. 6, on a reduced scale.
Figure 11:
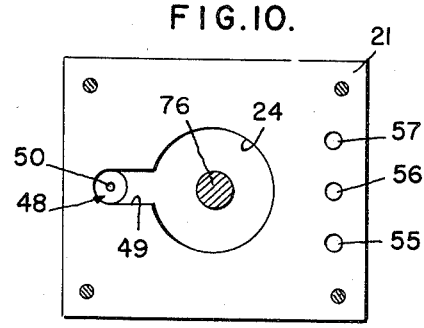
Fig. 11 is a sectional view taken on the line 11—11 of Fig. 6, on a reduced scale.
Figure 5:
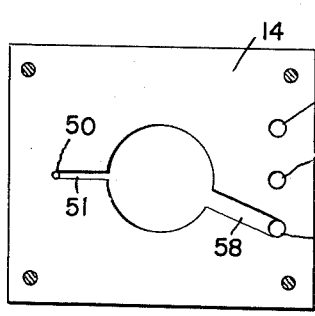
Fig. 5 is a view in top plan of a fully assembled or completed valve of one type, fabricated in accordance with the present invention.
Figure 5:
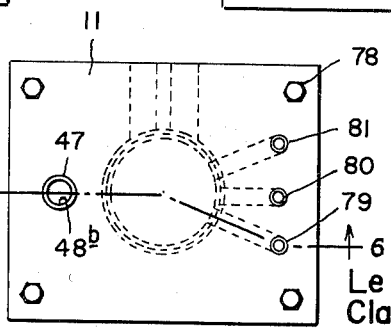

In Fig. 6 there is shown in transverse section a completely constructed valve of one type in which the plate arrangement of Fig. 2 is employed, with additional elements to complete the valve structure. In referring to this valve construction, a top plan view of which is shown in Fig. 5 and sectional views are shown in Figs. 7 to 11 inclusive, the same reference numerals will be employed to indicate the different plates or laminae, as are applied to Figs. 1 to 4 inclusive.

In setting up the valve structure of Figs. 5 to 11, the bottom plate 12 has assembled thereon the pouch laminae or plates 13, 14, 15 and 16, as shown, so that the openings in these plates of progressively increasing diameter from the bottom plate to the top one, form a pouch depression or recess of circular form which is generally designated 64.

Disposed over the top surface of the top lamina 16 of the group is a diaphragm sheet 65 preferably of leather, but which may be of any other suitable material, and the central portion of this diaphragm is initially pressed or formed into a downwardly extending or curving pouch 66 which extends into the recess 64, as shown.

Secured to the top side of the pouch 66 is a contact button 67.

Overlying and resting upon the diaphragm sheet 65 are the spacer plates 21, 22 and 23, the lower valve seat forming plate 27, the spacers 28 and 29 and the uppermost valve seat forming plate 32. As shown, the plates 27 and 32 are arranged with the seat forming flanges 27b and 32b in opposed relation.

The numeral 68 generally designates a free moving valve element which comprises the cylindrical shank 69 lying in and extending through the opening 27a of the plate 27 and carrying on its upper end the valve disc 70. The shank 69 is of a diameter materially less than the diameter of the opening 27a so that when the disc 70 is raised from the seat 27b, fluid may pass freely through the opening.

As shown, the assemblage of plates described in connection with the valve shown in Fig. 6 provides a lower fluid chamber which is generally designated 71 and an intermediate chamber which is generally designated 72. The valve shank extends downwardly into the lower chamber 71 and when the disc 70 is seated on the lower seat, the lower end of the shank is in close proximity to the lowered button 67 of the diaphragm pouch 66.

The upper and lower faces of the disc 70 carry suitable facings 70' which may be of leather or other material to insure proper closing contact with the seats 27b and 32b.

Upon the uppermost seat plate or lamina, the spacer 33 rests and upon this spacer is the breather spacer plate 35 which, in turn, supports the spacer plate 38. Between the breather plate 35 and the spacer plate 38 is located the diaphragm sheet 73 which corresponds to the sheet 65 and which has its central portion formed or shaped into a downwardly extending pouch 74. This pouch forms the upper side or top of a third chamber which is generally designated 75 and the center of the pouch 74 is secured to the top end of the small diameter stem 76 which extends upwardly from and is carried by the center of the valve disc 70 which, in turn, is attached or secured to the shank 69 of the valve unit 68.

The breather slots or passages open into the chamber 75, as shown, and as is also shown here, when the valve disc 70 is at rest upon the seat 27b, it will be in spaced relation with the seat 32b of the uppermost plate.

The topmost group of pouch plates or laminae 40–43 form a top recess or pocket which is generally designated 77 into which the pouch 74 may rise when the valve element 68 is moved upwardly.

The numeral 78 designates the securing bolts which are passed through the assembled plates to secure the same together for the formation of the valve casing and the maintenance of the parts thereof in proper assembled relation.

In the use of the valve structure of Figs. 5 to 11 in a vacuum system, a vacuum line is connected to a nipple 48b which is secured in the opening 48 of the top plate to communicate with the passage 48a extending down through the valve body and the apertures 52, 53 and 54 have connected therein nipples 79, 80 and 81 respectively (Fig. 5) for the attachment of pipes or tubes (not shown) to the valve unit.

When a vacuum is maintained in the passage 48a and the line connected with the nipple 79, which communicates through the passage 55 with the recess 64, is maintained closed against the entrance of atmospheric air, the valve unit 68 will be in the position shown in Fig. 6 where the disc 70 is seated on the seat 27b so that a vacuum or reduced pressure is maintained in the lower chamber. The bleed passage 50 permits a vacuum to be created in the recess 64 at such time. When the disc 70 is seated, as illustrated in Fig. 6, on the seat 27b and there is a reduced pressure in the pouch recess 64, it will be maintained in this position by the pressure of atmospheric air entering the chamber 75 by way of the breather ports or passages 37. Atmosphere is also admitted through the chamber 75 and the chamber 72 to the passage 59 leading to the passage 56 and to a vacuum unit connected thereto. If, now, the line connected with the nipple 79 is opened to the atmosphere, the diaphragm pouch 66 will be flexed upwardly to shift the valve 68 from the seat 27b onto the seat 32b and a vacuum will be drawn through the central chamber to and through the line connected with the nipple 80 to act upon a vacuum operated unit (not shown) connected with the passage 56 which leads through the slot 59 into the central chamber 72 as shown in the sectional view forming Fig. 9. Upon this operation or movement of the valve element 68, a vacuum will be created in the recess 77 above the pouch 74 which is now flexed upwardly into the recess 77. At this time, the passage 57 communicating through the slot 60 with the recess 77 above the diaphragm pouch 74 is closed against the admission of atmospheric air but, upon the admission of atmospheric air into the recess 77 by the opening of the line connected with the nipple 81, the valve unit 68 will return to the position shown in Fig. 6 to shut off the vacuum drawn through the passage 56 and the tube or pipe connected with the nipple 80.

As illustrated, the effective areas of the diaphragm pouches 66 and 74 are materially greater than the openings 27a and 32a and the area of the disc 70, and this differential brings about the desired movement of the disc 70 to the seats 27b and 32b when atmospheric air is admitted to the recess side of either of the pouch diaphragms in the operation of the valve. Considering the valve structure with the parts in the positions shown in Fig. 6, when atmospheric air is admitted to the recess 64 by way of the passage 55, the differential between the areas of the pouch diaphragm and the valve disc 70 causes the disc to move to seat 32b. A holding action is then obtained even though the passage 55 leading to the recess 64 may be closed against the admission of atmospheric air by reason of the fact that vacuum would then be applied by way of the chamber 71, the port 27a, the chamber 72 and the radial passage 62, to the upper side of the diaphragm 64, through passage 57a (see Fig. 4), passage 61 and radial passage 60. The reduction of pressure upon the upper side of the diaphragm 64, in this manner, together with the effect of atmospheric pressure on the under side of the diaphragm, admitted to the chamber 75 through the breather passages 37, will maintain the upper face of the valve disc 70 seated against seat 32b. Reverse movement of the valve element 68 may be accomplished by the admission of atmospheric air to the port 54 so as to return the element 68 to position the disc 70 on the lower seat 27b, as shown in Fig. 6.

The bleed passage 61 and passage 57a connected therewith provides for the maintenance of the reduced pressure or vacuum in the recess 77 while the passage 57 is closed against the admission of atmospheric air.

Figs. 13 to 17 illustrate two other types of valves which may be constructed or built up by the use of the plates or laminae shown in Figs. 1 to 4.

The valve structure of Figs. 12, 13 and 14 is of a relatively simple type and is provided for use in a vacuum system where it is desired to maintain a vacuum actuated unit under the effect of the vacuum until it is desired to remove such effect by the admission of atmospheric air into the line. In this construction, it will be seen that the assemblage of the base plate 12, the pouch plates 13, 14, 15 and 16, the pouch diaphragm 65 and the spacers 21, 22 and 23 is the same as for the valve structure shown in Fig. 6.

The valve seat plate 27 in this valve structure is reversed so that the seat flange 27b is directly downwardly, as illustrated, and the uppermost valve seat plate 32 is reversed from the position shown in Fig. 6 so that the seat flange 32b is directed upwardly and these two plates are separated by the spacers 28 and 29 as in the previous structures.

In this set up of the plates, the movable valve element, which is generally designated 82 and comprises the shank 83 which extends through the aligned openings 27a and 32a of the plates 27 and 32, as shown, carries upon its upper and lower ends the valve discs 84 and 85 respectively. The plate 32 has connected in the aperture 32' the nipple 86 for the connection of a vacuum line communicating with the passage 48a and nipples 87 and 88 are connected in other apertures 89 and 90 respectively for the connection of pipes or tubes respectively with the passages 55 and 56.

In the employment of the valve shown in Figs. 12 to 14, in a vacuum system, a vacuum may be drawn and maintained through the valve by way of the lower chamber 71, the opening 27a of the plate 27, the slot 59 in plate 29 and the nipple 88 so long as the passage 55 is maintained closed against the entrance of atmospheric air. When such vacuum is to be broken or interrupted, atmospheric air is admitted by way of the nipple 87 and passage 55 into the pouch pocket or recess 64 and the resulting upward movement of the diaphragm pouch will elevate the valve element 82 to close the disc 85 against the seat 27b and unseat the disc 84 from the seat 32b.

In the valve construction illustrated in Figs. 15 to 17, the same plates are employed as in the construction of the valve shown in Fig. 13 with the exception that the second or top valve seat plate 32 is replaced by the top cover plate 11' having a central opening 91, an opening 32" for the connection of a vacuum line nipple 92 and apertures or openings 93 and 94 corresponding to openings 52 and 53 in the plate 11, for the connection of nipples 95 and 96 leading to the passages 55 and 56 respectively. In this last mentioned valve structure, the valve seat plate 27 is placed in the same position it is in in the first described valve shown in Fig. 6 so that the seat flange 27b is directed upwardly.

In this last described valve structure, the movable valve element is generally designated 97 and comprises the cylindrical shank portion 98 which extends through the opening 27a of the plate 27 and carries upon its upper end a valve disc 99 which is closed upon the seat 27b while a vacuum is maintained in the lower chamber 71 and the passage 55 is closed against the entrance of atmospheric air. When this passage 55 is opened to admit atmospheric air, the vacuum maintained in the chamber 71 will elevate the pouch portion of the diaphragm 65 and raise the valve element 97 into contact with the underside of the plate 11' to cover and close the opening 91. By this means the vacuum will be applied through the chamber 71 by way of the plate opening 27a, to the passage 56, as will be readily apparent.

If desired, the opening 91 may be covered by door screen 91a to prevent the entrance of dirt into the upper chamber.

From the foregoing, it will be seen that there is provided by the present invention a novel method of making or fabricating valves of various types by the employment of duplicate stamped parts which may be assembled in different relations and/or built up from a common base assembly according to the type of valve desired.

What is claimed is:

1. A valve structure comprising a plurality of laminae stacked one upon the other, said plurality of laminae comprising a bottom imperforate lamina, a series of laminae having concentric central openings of graduated size from the bottom up forming a pocket, a diaphragm overlying said pocket and having a pouch depressed into the pocket, a plurality of spacer laminae over said diaphragm and having concentric central openings forming a chamber over the pocket, a top valve seat lamina having a central opening defined by an upturned seat flange and opening into said chamber, a free moving valve member having a shank extending through the opening of said valve seat lamina with its lower end in closely spaced proximity to the depressed pouch and a valve disc overlying and engaging said seat flange, a series of spacer lamina on said seat lamina and having concentric center openings forming a top chamber, a top lamina on said last series and having a central opening adapted to be closed by said disc upon the elevation of the valve from its seat, a vacuum passage opening through the top lamina and extending down through the laminae to the diaphragm and communicating with the first chamber above the diaphragm, a bleed port leading from said passage into said pocket below the diaphragm, and a pair of passages opening through the top lamina and extending down through certain of the underlying laminae, one of said passages communicating with said pocket beneath the pouch and the other passage communicating with the chamber above the valve seat lamina.

2. The invention according to claim 1, wherein the communication between the vacuum passage and the first chamber is by way of a slot formed in a spacer lamina and opening into the center opening thereof and the communications between the said one of the passages and the pocket and between the said other passage and the chamber above the valve seat lamina are respectively by way of a slot formed in a lamina lying below the diaphragm and opening into the central opening of the last named lamina and a slot formed in a spacer lamina lying above the valve seat lamina and opening into the central opening of such spacer lamina.

3. A valve casing comprising a plurality of preformed laminae disposed in stacked relation to each other, one thereof constituting a base lamination, others of the laminae each having a center opening and fluid passage openings therethrough, certain of said others of the laminae having at least one slot leading from a fluid passage opening to the center opening, said others of the laminae having corresponding openings thereof positioned in alignment to form; a casing having a bottom diaphragm pocket; a first chamber above and opening into said pocket; a first opening at the top of and communicating with the first chamber and of reduced size with respect thereto to form a valve seat; a second chamber above and communicating with the valve seat forming said first opening; a second opening at the top of and communicating with the second chamber and in line with the first seat forming opening, and fluid passages communicating with the pocket and said chambers and each passage having an open end for connection with a fluid conducting pipe, and means securing the laminations together as a unit.

4. The invention according to claim 3, wherein the lamination having said second opening is an inverted duplicate of the lamination having the first seat forming opening.

5. The invention according to claim 3 wherein the valve seat forming said first opening is defined by an encircling seat flange.

6. A valve casing comprising a plurality of preformed laminae disposed in stacked relation to each other, one thereof constituting a base lamination, others of the laminae each having a center opening and fluid passage openings therethrough, certain of said others of the laminae having at least one slot leading from a fluid passage opening to the center opening, said others of the laminae having corresponding openings thereof positioned in alignment to form; a casing having a bottom diaphragm pocket; a first chamber above and opening into said pocket; a first opening at the top of and communicating with the first chamber and of reduced size with respect thereto to form a valve seat; a second chamber above and communicating with the valve seat forming first opening; a second opening at the top of and communicating with the second chamber and in line with the first seat forming opening; a third chamber above and in communication with the second opening; a top diaphragm pocket above and opening into the third chamber; fluid passages communicating with certain of the pockets and chambers, and a top lamination having fluid openings each communicating with a passage and at least one lamination having a channel extending from the center opening thereof to an outer edge and positioned to have the channel at its inner end opening into the third chamber, and means securing the laminations together as a unit.

7. A valve structure comprising a plurality of laminae stacked one upon the other, said plurality of laminae comprising a bottom imperforate lamina, a series of laminae having concentric central openings of graduated size from the bottom up forming a pocket, a diaphragm overlying said pocket and having a pouch depressed into the pocket, a plurality of spacer laminae over said diaphragm and having concentric central openings forming a chamber over the pocket, a first valve seat lamina having a central opening defined by a downturned valve seat flange and opening into said chamber, a free moving valve member having a shank extending through the opening of said valve seat lamina with its lower end in closely spaced proximity to the depressed pouch and carrying a valve disc for engagement with said seat flange, a series of spacer laminae on said valve seat lamina and having concentric openings forming a top chamber, a second valve seat lamina on said last series and having a central opening defined by an upturned valve seat flange, said valve member having its shank extending through both valve seat laminae and having a second disc thereon engaging the second valve seat, a vacuum passage opening through the second valve seat lamina and extending down through the laminae to the diaphragm and communicating with the first chamber above the diaphragm, a bleed port leading from said passage into said pocket below the diaphragm, and a pair of passages opening through the second valve seat lamina and extending down through certain of the underlying laminae, one of said pair of passages communicating with said pocket beneath the pouch and the other one of the pair of passages communicating with the chamber above the first valve seat lamina.

8. A valve structure comprising a plurality of laminae stacked one upon the other, said plurality of laminae comprising a bottom imperforate lamina, a series of laminae having concentric central openings of graduated size from the bottom up forming a pocket, a diaphragm overlying said pocket and having a pouch depressed into the pocket, a plurality of spacer laminae over said diaphragm and having concentric central openings forming a chamber over the pocket, a first valve seat lamina having a central opening defined by an upturned valve seat flange and opening into said chamber, a free moving valve member having a shank extending through the opening of said valve seat lamina with its lower end in closely spaced proximity to the depressed pouch and carrying a valve disc for engagement with said seat flange, a series of spacer laminae on said valve seat lamina and having concentric openings forming a top chamber, a second valve seat lamina on said last series having a central opening defined by a valve seat flange directed down toward the seat flange of the first valve seat lamina, said valve disc being movable between the seat flanges, spacer laminae lying upon the second valve seat lamina and having concentric openings forming a top chamber, a breather passage forming a communication between said top chamber and the outside atmosphere, a diaphragm overlying the last named spacer laminae and forming the top of the top chamber and having a central pouch, a series of pouch laminae overlying the last named diaphragm and having concentric openings of decreasing size forming a pouch pocket, a top lamina overlying the last named pouch laminae, an air passage opening through the top lamina and communicating with the pouch pocket above the last named diaphragm, a vacuum passage opening through the top lamina and extending down through the laminae to the first diaphragm and communicating with the first chamber above the first diaphragm, a bleed port leading from said passage into said pocket below the first diaphragm, a pair of passages opening through the top lamina and extending down through certain of the underlying laminae, one of said pair of passages communicating with said pocket beneath the first diaphragm pouch and the other one of the pair of passages communicating with the chamber above the first valve seat lamina.

References Cited in the file of this patent
UNITED STATES PATENTS

| | | |
|---|---|---|
| 678,872 | Howard | July 23, 1901 |
| 2,295,111 | Hemmings | Sept. 8, 1942 |
| 2,498,396 | Cunningham | Feb. 21, 1950 |
| 2,679,172 | Clevenger | May 25, 1954 |
| 2,747,611 | Hewitt | May 29, 1956 |
| 2,807,280 | Kittredge | Sept. 24, 1957 |